3,048,872
WINDSHIELD WIPER
James C. Kerrigan, Detroit, Mich., assignor to Chrysler Corporation, Highland Park, Mich., a corporation of Delaware
Filed Apr. 7, 1959, Ser. No. 804,837
3 Claims. (Cl. 15—250.36)

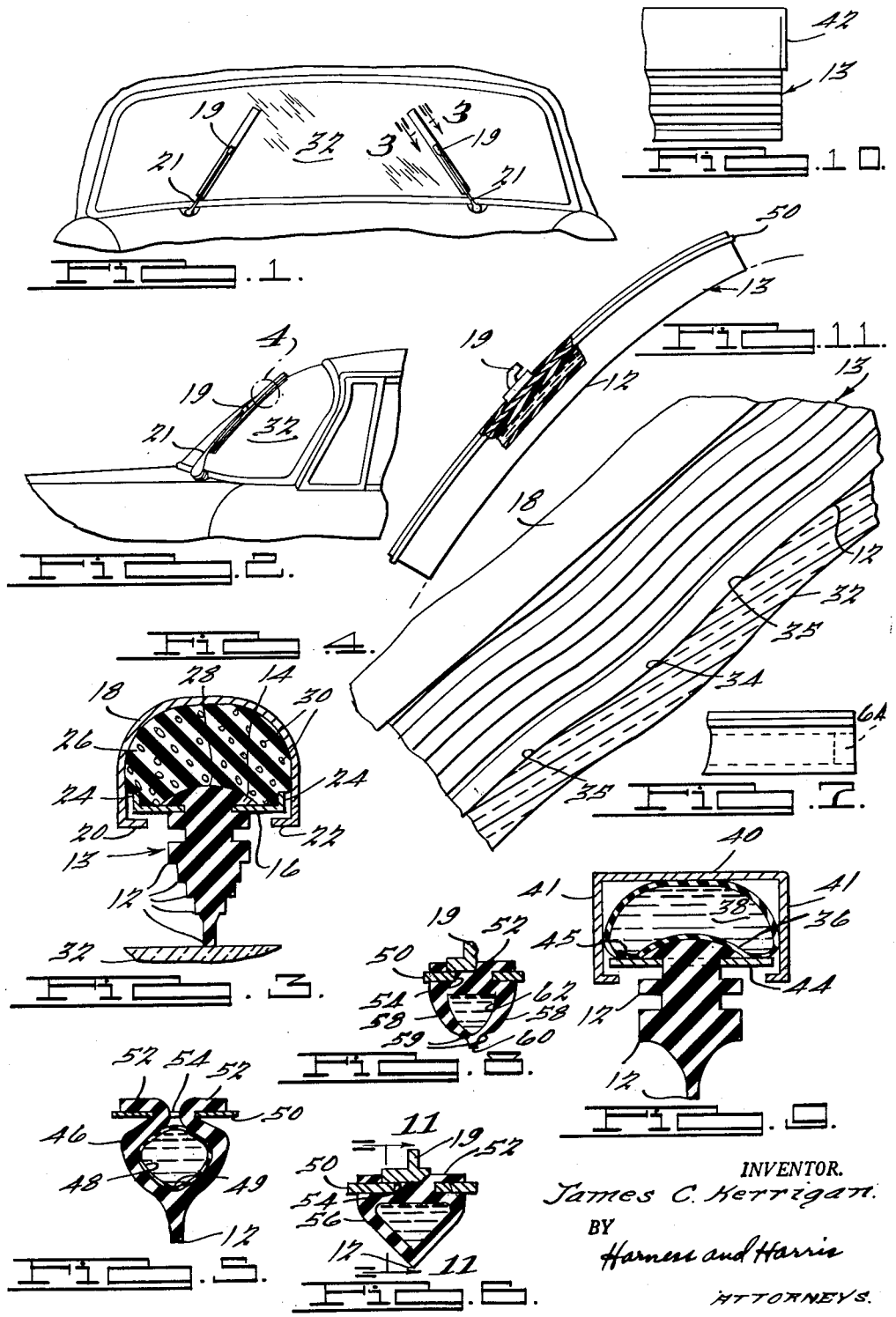

This invention relates to windshield wiper blades and in particular to those types which are specifically adapted for wiping windows and windshields having irregular curvatures.

In the conventional type of windshield wiper blade, the pressure on the wiping edge is attained by the blade actuating arm bearing against the blade at one or several points along the length of the blade. While this pressure applying mechanism may be suitable for wiping fairly large irregular areas such as the large radius curved portions of the modern type windshields, it is not sufficient to cause the wiping edge of the blade to get down into windshield depressions or cavities having relatively small radii of curvature. The present invention contemplates utilizing a fluid pressure means which will urge the entire wiping edge of the blade toward the windshield with equally distributed force so that pressure against one portion of the wiping edge caused by a relatively high portion of the windshield will simultaneously urge other portions of the wiping edge down into depressions and cavities in the windshield.

It is therefore a major object of this invention to provide a blade having suitable resiliency and being pressure urged so as to enable it to wipe in a competent fashion windshields having multiple irregularities in the surface thereof.

Further objects and advantages of the present invention will become apparent from the following description and drawings, in which:

FIGURE 1 is a front view of an automobile windshield showing the windshield wipers mounted thereon;

FIGURE 2 is a side view of the windshield of FIGURE 1 showing the major curvature of the windshield;

FIGURE 3 is a cross sectional view taken along line 3—3 of the blade of FIGURE 1;

FIGURE 4 is an enlarged partial cross sectional view of the portion denoted "4" of FIGURE 2 showing the cavities or depressions and high spots in the windshield and the relative position thereto of the wiping edge of the blade;

FIGURE 5 is a cross sectional view of a variation of the blade of FIGURE 3;

FIGURE 6 is a cross sectional view of another variation of the blade;

FIGURE 7 is a side view of a portion of the blade of FIGURE 6 showing the end sealing means;

FIGURE 8 is a cross sectional view of another variation of the blade;

FIGURE 9 is a cross sectional view of another variation of the blade;

FIGURE 10 is a side view of the shell of either FIGURE 3 or FIGURE 9 showing the end enclosing means therefor; and FIGURE 11 is a cross sectional view of a blade structure having an initial curve set corresponding to 11—11 of FIGURE 6.

Referring to FIGURE 3, a wiper blade denoted 10 is provided with a plurality of wiping edges 12 and a locking tab means denoted 14 which secures the blade 13 to a thin flexible plate 16. This plate 16 extends the full length of the blade and provides support thereto. Plate 16 is shown to be fitted inside of a shell 18 which is formed over at edges 20 and 22 to secure plate 16 therein. Plate 16 is provided with centering flanges 24 on each side thereof, which flanges are spaced from the sides of shell 18 and extend upwardly into a synthetic sponge rubber or a plastic mass 26 having air pockets 30 interspersed throughout. These flanges 24 will not allow frictional engagement of plate 16 with shell 18 so that a twisting of the blade 13 to one side by movement across the windshield will be opposed only by force exerted by the material 26 upon plate 16 and the inner head or rear side 28 of the blade 13. Shell 18 may be provided with an attaching element 19 for connecting the blade 13 to the wiper arm 21, such element being of a well known type such as that shown in FIGURE 6 of Patent No. 1,946,073. The sponge rubber material 26 will exert a substantially uniform pressure upon plate 16 and head 28 of blade 13 when pressure is exerted on any portion of the wiping edge of blade 13 at any point along its length. This hydraulic reaction is caused by the nature of the spongy material which includes the air pockets 30 which will act substantially as a hydraulic fluid when compressed.

Referring to FIGURE 4, it is readily seen that the wiping edges 12 of blade 13 will substantially conform to a windshield 32 and be urged into depressions 34 therein by the force exerted on the wiping edge by high spots 35 of the windshield, which force induces hydraulic action of spongy mass 26 to force the wiping edge 12 into depressions 34.

As shown in FIGURE 9, a hydraulic sac 36 may be used in place of the spongy mass 26 which sac is closed at both ends and is completely filled with hydraulic fluid 38. The end of a shell 40 of FIGURE 9 and also of a shell 18 of FIGURE 3 may be closed at each end by an end closing tab 42 as shown in FIGURE 10. Sac 36 of FIGURE 9 is preferably secured to a plate 44 (resembling plate 16 of FIG. 3) along the top surface 45 of plate 44 by adhesive.

In FIGURE 5 is shown a variation of the wiper blade and it consists of a blade 46 of resilient material such as rubber or plastic formed in the shape of a channel and containing a fluid filled sac 48 of resilient rubber or plastic which exerts a uniform pressure on the rear side 49 of edge 12 throughout its entire length. Blade 46 is connected to a backing plate 50 by means of locking tabs 52 which extend through a slot 54 in said plate and bear against the upper surface thereof. The fluid that may be used in either of the blade variations of FIGURES 5 through 9 may be air, water, glycerin, glycol, etc. As shown in FIGURE 6 of the blade itself, 56, is an integral tube which contains the fluid. In FIGURE 8, a resilient tube having integral therewith a fluid filled chamber 62 has walls 58 of varying thickness at the portions 59 so as to allow the wiping portion 60 thereof to move preferentially with respect to portions 58 of the walls as the pressure varies within the chamber 62. As shown in FIGURE 7 the ends of the tubes shown in FIGURES 5, 6, and 8 may be closed by end plugs 64 which are retained by a suitable adhesive or, in the alternative, the plugs 64 may be retained by vulcanizing after the tube has been filled with fluid.

In the structural variations of FIGURES 5 through 8 the attaching element 19 may be secured directly to the flexible steel backing plates 50 by welding or other suitable means. Moreover, the backing plate 50 may be given an initial set which conforms to the major radius of curvature of the windshield as shown in FIGURE 11 and will therefore tend to straighten as the blade moves over the flatter portions of the windshield. This curvature of plate 50 augments the hydraulic force on the blade and reduces the area of the hydraulic chamber necessary for conforming to the curvature extremes of the windshield.

The rubber blades shown in FIGURES 5 through 8 may be conveniently extruded in much the same manner as the blades of FIGURES 3 and 9 or may be molded in a conventional manner around a removable core.

It is obvious that various modifications in the structure of the backing plate and the shape of the shell and the sac and the contour of the blades and wiping edges 12 thereof may be made for the purpose of providing a workable blade for many and varied types of wiping applications without deviating from applicant's invention.

I claim:

1. In a window wiper, a blade having a wiping edge extending therealong, pressure means operatively associated with said blade and adapted to exert a uniform pressure on said wiping edge as said edge is brought into wiping contact with an irregular surface, said pressure means comprising a shell movably secured to said blade and containing resilient material, said material bearing against said blade to urge it away from said shell, and centering means flexible in one direction and operatively connected to said blade and bearing against portions of said resilient material inwardly from the sides thereof to prevent frictional engagement of said blade and said centering means with said shell as said centering means and said blade are urged further into said shell.

2. A windshield wiper comprising a blade having an elongated resilient wiping member capable of conforming to a surface to be wiped, an elongated support member extending longitudinally of said wiping member and secured thereto, said support member being flexible in a single plane and operative to offer throughout its length little resistance to flexing in a plane substantially perpendicular to a surface to be wiped while remaining substantially inflexible in a plane substantially parallel to said surface, said wiper further including an elongated backing member having a central cavity in which said elongated support member is retained, said backing member further being provided with an elongated slot through which said resilient wiping member depends, and an elongated, deformable, self restoring element confined in the above mentioned cavity between said support member and said backing member and operable to conform said wiping member to varying contours of a surface to be wiped.

3. A windshield wiper comprising a blade having an elongated resilient wiping member capable of conforming to a surface to be wiped, an elongated support member extending longitudinally of said wiping member and secured thereto, said support member being flexible in a single plane and operative to offer throughout its length little resistance to flexing in a plane substantially perpendicular to a surface to be wiped while remaining substantially inflexible in a plane substantially parallel to said surface, said wiper further including an elongated backing member having an upper surface and legs depending therefrom to define an intermediate space, said legs each being provided with an inwardly directed portion defining an elongated slot of less width than the width of the above mentioned space and less width than the width of said support member to accommodate retention of said support member in the above-mentioned space with said resilient wiping member depending therefrom through the above mentioned slot, and an elongated, deformable, self-restoring element confined in the above mentioned intermediate space between said support member and the upper surface of said backing member and operable to conform said wiping member to varying contours of a surface to be wiped.

References Cited in the file of this patent

UNITED STATES PATENTS

| 1,699,634 | Smulski | Jan. 22, 1929 |
| 2,090,702 | Rodrick | Aug. 24, 1937 |
| 2,657,415 | Rappl | Nov. 3, 1953 |

FOREIGN PATENTS

| 707,559 | Great Britain | Apr. 21, 1954 |